United States Patent
Luo et al.

(10) Patent No.: US 8,599,580 B2
(45) Date of Patent: Dec. 3, 2013

(54) BUCK CONVERTER

(75) Inventors: Qi-Yan Luo, Shenzhen (CN); Song-Lin Tong, Shenzhen (CN); Peng Chen, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 252 days.

(21) Appl. No.: 13/092,217

(22) Filed: Apr. 22, 2011

(65) Prior Publication Data

US 2012/0126767 A1    May 24, 2012

(30) Foreign Application Priority Data

Nov. 22, 2010   (CN) .......................... 2010 1 0553146

(51) Int. Cl.
*H02M 3/335* (2006.01)
(52) U.S. Cl.
USPC ........................... 363/21.12; 315/247; 307/64
(58) Field of Classification Search
USPC ................ 323/222, 224, 282–288, 315, 316;
363/16–20, 21.04, 21.01, 21.18, 50,
363/56.01, 65, 79, 89, 97; 315/291, 293,
315/312, 307, 247, 309; 327/534–543
See application file for complete search history.

(56) References Cited

U.S. PATENT DOCUMENTS

| | | | | |
|---|---|---|---|---|
| 5,623,187 A * | 4/1997 | Caldeira et al. | ............... | 315/307 |
| 5,796,215 A * | 8/1998 | Parry et al. | .................... | 315/224 |
| 6,407,511 B1 * | 6/2002 | Yang et al. | .................... | 315/224 |
| 6,784,624 B2 * | 8/2004 | Buonocunto | ................. | 315/247 |
| 7,375,476 B2 * | 5/2008 | Walter et al. | .................. | 315/312 |
| 8,111,051 B2 | 2/2012 | Sakai et al. | | |
| 8,203,377 B2 * | 6/2012 | Kelley et al. | .................. | 327/427 |
| 8,274,268 B2 * | 9/2012 | Yen | ................ | 323/282 |
| 2005/0128671 A1 | 6/2005 | Miyamoto | | |
| 2011/0176338 A1 | 7/2011 | Huang | | |

FOREIGN PATENT DOCUMENTS

| | | |
|---|---|---|
| CN | 101194411 A | 6/2008 |
| CN | 201623643 U | 11/2010 |

* cited by examiner

*Primary Examiner* — Rajnikant Patel
(74) *Attorney, Agent, or Firm* — Altis Law Group, Inc.

(57) ABSTRACT

A buck converter includes a first electrical switch and a second electrical switch connected in series, a PWM module coupled to the gate of the first electrical switch through a first adjustable resistance module and coupled to the gate of the second electrical switch through a second adjustable resistance module, a filter circuit coupled between the connecting node of the two different electrical switches and an output node, and a control module for adjusting values of the first adjustable resistance module and the second adjustable resistance module and acquiring a voltage value from the connecting node.

8 Claims, 2 Drawing Sheets

BUCK CONVERTER

BACKGROUND

1. Technical Field

The present disclosure relates to a buck converter.

2. Description of Related Art

In many buck converters, a metal oxide semiconductor field (MOSFET) is used as an electrical switch. However, when the MOSFET is turned off, a peak voltage is generated between a drain of the MOSFET and a source of the MOSFET, which may breakdown the MOSFET.

What is needed therefore is a buck converter which can overcome the above limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the views.

DETAILED DESCRIPTION

Figure 1:
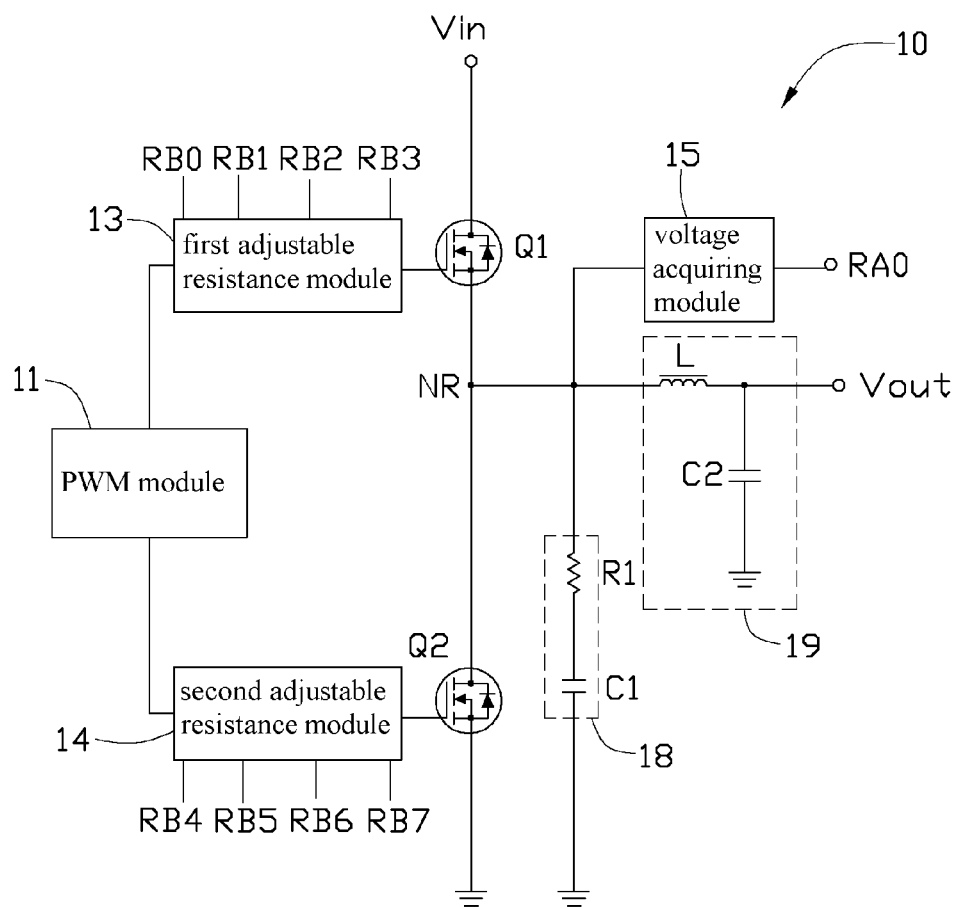
FIG. 1 is a schematic, block diagram of a buck converter in accordance with an embodiment of the present disclosure.
Figure 2:
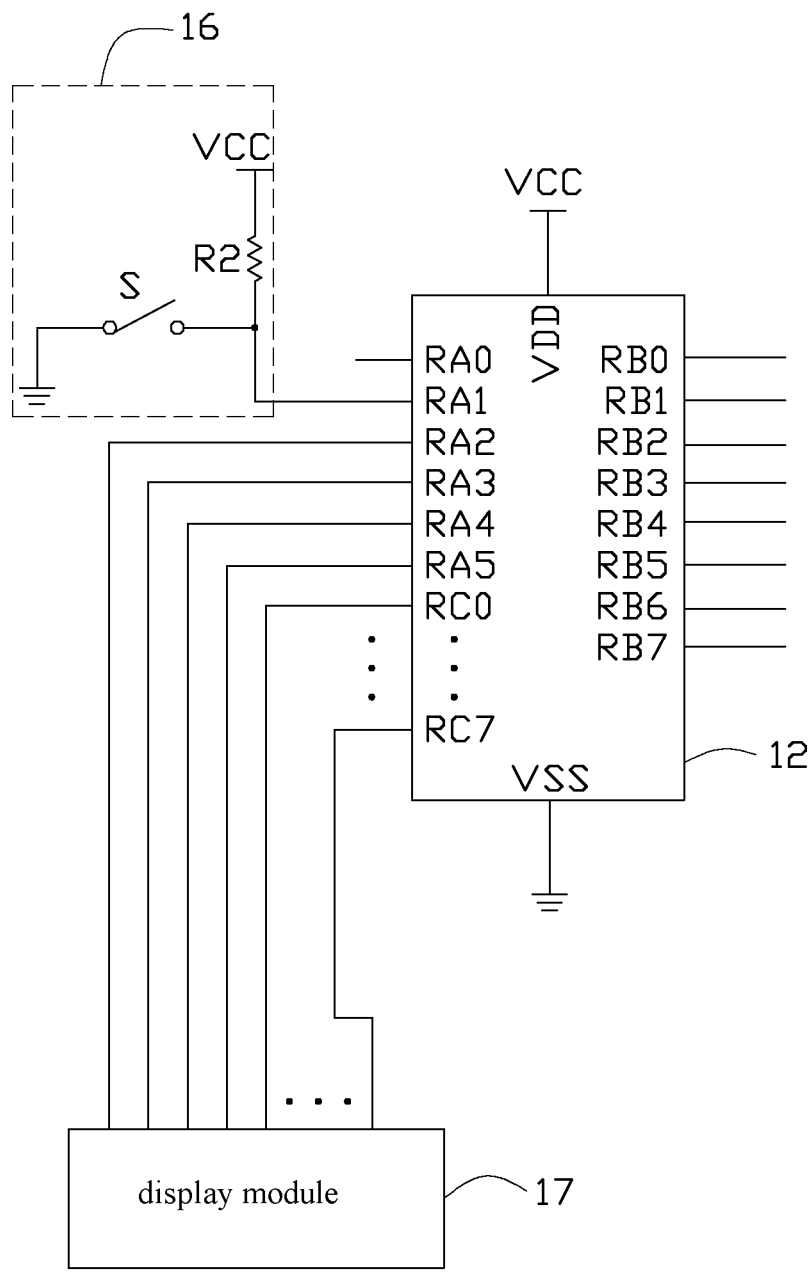
FIG. 2 is a schematic, block diagram showing a detailed connection between a control module of the buck converter and other components of the buck converter in FIG. 1.

As shown in FIGS. 1-2, a buck converter in accordance with an embodiment of the present disclosure includes an input node Vin, a pulse width modulation (PWM) module 11, a first electrical switch Q1, a second electrical switch Q2, a voltage acquiring module 15, a control module 12, a first adjustable resistance module 13, a second adjustable resistance module 14, a switch module 16, a display module 17, a snubber module 18, a filter circuit 19 and an output node Vout. The input node Vin is adapted for connecting to a power source, thereby inputting the power to the buck converter. The output node Vout outputs a relatively lower voltage to a load.

The first electrical switch Q1 and the second electrical switch Q2 are coupled in series between the input node Vin and a reference node, such as the ground (GND). In the illustrated embodiment, each of the first and second electrical switches Q1 and Q2 is a MOSFET, also other types of electronic switches can be used such as P-channel devices or bipolar junction transistors. The first electrical switch Q1 has a drain coupled to the input node Vin and a source coupled to an intermediate node NR. The second electrical switch Q2 has a drain coupled to the intermediate node NR and a source coupled to the GND.

The filter circuit 19 includes an inductor L and an output filter capacitor C2. The inductor L has a first terminal coupled to the intermediate node NR and a second terminal coupled to the output node. The output filter capacitor C2 is coupled between the output node and the GND. The filter circuit 19 outputs a DC voltage.

The snubber module 18 is coupled between the intermediate node NR and the GND. The snubber module 18 includes a resistor R1 and a capacitor C1 connected in series. The resistor R1 is coupled to the intermediate node NR, and the capacitor C1 is coupled to the GND. The snubber module 18 is configured for decreasing a peak voltage between the drain of Q2 and the source of Q2.

The PWM module 11 is coupled to the first electrical switch Q1 through the first adjustable resistance module 13 and is coupled to the second electrical switch Q2 through the second adjustable resistance module 14. The PWM module 11 provides gate drive signals to the gates of the first and second electrical switches Q1, Q2, respectively. The PWM module 11 turns on the first electrical switch Q1 while turning off the second electrical switch Q2 during a first portion of each PWM cycle, and then turns on the second electrical switch Q2 while turning off the first electrical switch Q1 during a second portion of each PWM cycle. After that, the intermediate node NR will output a square-wave voltage. The square-wave voltage is rectified by the filter circuit 19 and output a DC voltage in the output node Vout.

The control module 12 includes a plurality of first resistance control ports RB0-RB3, a plurality of second resistance control ports RB4-RB7, an acquiring port RA0, a switch port RA1, a plurality of display control ports RA2-RA5 and a plurality of data ports RC0-RC7. The first resistance control ports RB0-RB3 of the control module 12 are coupled to the first adjustable resistance module 13 for adjusting the first resistance value between the gate of the first electrical switch Q1 and the PWM module 11. The second resistance control ports RB4-RB7 of the control module 12 are coupled to the second adjustable resistance module 14 for adjusting the second resistance value between the PWM module 11 and the gate of the second electrical switch Q2.

The voltage acquiring module 15 is coupled between the intermediate node NR and acquiring port RA0 of the control module 12. The voltage acquiring module 15 transmits the voltage of the intermediate node NR to the control module 12. The display control ports RA2-RA5 of the control module 12 are coupled to the display module 17 to transmit control signals to the display module 17. The data ports RC0-RC7 of the control module 12 are coupled to the display module 17 to transmit display data to the display module 17.

The switch module 16 is coupled to the switch port RA1 of the control module 12 and is configured for turning on or turning off the control module 12. The switch module 16 includes a switch S and a second resistor R2. The switch S is coupled between the GND and the switch port RA1, and the second resistor R2 is coupled between a constant voltage source Vcc and the switch port RA1. The switch S is configured for turning on or turning off the control module 12.

In operation, press the switch S down to turn on the control module 12. The control module 12 transmits a control signal '0000' to the first adjustable resistance module 13 through the first resistance control ports RB0-RB3. The resistance of the first adjustable resistance module 13 will be changed to a first value, for example 0.51 ohm. And then, the resistance of the second adjustable resistance module 14 is changed to different values through the second resistance control ports RB4-RB7. For example, the control module 12 transmits a control signal '0000' to the second adjustable resistance module 14 to change the resistance thereof to 0.51 ohm, or the control module 12 transmits a control signal '0001' to the second adjustable resistance module 14 to change the resistance thereof to 1 ohm. Therefore, the control module 12 will acquire a first group of peak voltages Vds from the acquiring port RA0. The first group of peak voltages Vds is stored in a memory unit inside the control module 12. In this embodiment, the resistance of the second adjustable resistance module 14 is changing from 0.5 ohm to 10 ohm. Especially, the resistance of the second adjustable resistance module 14 can be selected from one of a group of 0.51 ohm, 1 ohm, 1.5 ohm, 2 ohm, 2.5 ohm, 3 ohm, 3.5 ohm, 3.9 ohm, 4.7 ohm, 5.1 ohm, 5.6 ohm, 6.2 ohm, 6.8 ohm, 7.5 ohm, 8.2 ohm, 9.1 ohm, 10 ohm.

After the different resistances of the second adjustable resistance module 14 have been tested, the control module 12 transmits a second control signal "0001" to the first adjustable resistance 13 through the first resistance control ports RB0-RB3. Then, the resistance of the first adjustable resistance 13 will be changed to a second value, for example, 1 ohm. The resistance of the second adjustable resistance module 14 is then changed to different values through the second resistance control ports RB4-RB7 and thus acquire a second group of peak voltages Vds from the acquiring port RA0. In this manner, changing the resistances of the first adjustable resistance 13 and the second adjustable resistance 14 and different peak voltages will be acquired. The peak voltages and the corresponding value of the first adjustable resistance module 13 and the second adjustable resistance module 14 are shown in the display module 17. Users can select the value of the first adjustable resistance module 13 and the second adjustable resistance module 14 with lowest peak voltage.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A buck converter comprising:
   a first electrical switch having a drain for connecting a power source, a gate, and a source coupled to an intermediate node;
   a second electrical switch having a drain coupled to the intermediate node, a gate, and a source coupled to a reference node;
   a filter circuit having one node coupled to the intermediate node and an output node for outputting power to a load;
   a first adjustable resistance module;
   a second adjustable resistance module;
   a PWM module coupled to the gate of the first electrical switch through the first adjustable resistance module and coupled to the gate of the second electrical switch through the second adjustable resistance module;
   a voltage acquiring module being coupled to the intermediate node; and
   a control module comprising at least one first control ports coupled to the first adjustable resistance module for adjusting the value of the first adjustable resistance module, at least one second control ports coupled to the second adjustable resistance module for acquiring the value of the second adjustable resistance module, and an acquiring port coupled to the voltage acquiring module for acquiring a voltage value of the intermediate node.

2. The buck converter of claim 1, wherein the at least one first control ports of the control module comprises a plurality of first resistance control ports.

3. The buck converter of claim 1, wherein the at least one second control ports of the control module comprises a plurality of second resistance control ports.

4. The buck converter of claim 1, further comprising a display module coupled to the display module for displaying the voltage value.

5. The buck converter of claim 1, further comprising a snubber module coupled between the intermediate node and the reference node, the snubber module comprising a resistor and a capacitor in series, the resistor being coupled to the intermediate node, the capacitor being coupled to the reference node.

6. The buck converter of claim 1, wherein the filter circuit comprises an inductor and an output filter capacitor, the inductor has a first terminal coupled to the intermediate node and a second terminal coupled to the output node; the output filter capacitor is coupled between the output node and the reference node.

7. The buck converter of claim 1, wherein the control module further comprises a switch port and a switch module being coupled to the switch port for turning on or turning off the control module.

8. The buck converter of claim 7, wherein the switch module includes a switch and a second resistor, the switch is coupled between the reference node and the switch port, and the second resistor is coupled between a constant voltage and the switch port.

* * * * *